United States Patent [19]

Stenkvist

[11] 4,145,562
[45] Mar. 20, 1979

[54] DC ARC FURNACE MELT ELECTRODE

[75] Inventor: Sven-Einar Stenkvist, Västerås, Sweden

[73] Assignee: ASEA Aktiebolag, Västerås, Sweden

[21] Appl. No.: 880,148

[22] Filed: Feb. 22, 1978

[30] Foreign Application Priority Data

Feb. 23, 1977 [SE] Sweden .............................. 7701974
Nov. 16, 1977 [SE] Sweden .............................. 7712918

[51] Int. Cl.² .............................................. H05B 7/00
[52] U.S. Cl. ............................................ 13/1; 13/9 R
[58] Field of Search ............................... 13/1, 9 ES, 9

[56] References Cited

U.S. PATENT DOCUMENTS 3,997,712  12/1976  Stenkvist ............................. 13/9 R
3,999,000  12/1976  Stenkvist ............................. 13/9 R Primary Examiner—R. N. Envall, Jr.
Attorney, Agent, or Firm—Kenyon & Kenyon, Reilly, Carr & Chapin

[57] ABSTRACT

A DC arc furnace melt electrode is formed by a metal bar encased by a refractory encasement forming a passage containing the bar with the latter having an inner end and maintained molten by the melt and an outer end for an electrical connection and maintained solid by cooling. Granules of refractory having higher density than the melt and molten electrode end are submerged in this end to prevent or retard any flow of the molten metal, for the purpose of reducing convection heating of the molten electrode end by the melt in the furnace hearth.

6 Claims, 2 Drawing Figures

DC ARC FURNACE MELT ELECTRODE

BACKGROUND OF THE INVENTION

A DC electric arc furnace has a hearth adapted to contain a melt and a melt electrode formed by a metal bar encased by a refractory encasement forming a passage containing the bar with the melt having an inner end contacted by the melt and an outer end adapted for connection with an electric power line.

The above construction provides for an electric circuit including the melt electrode, the melt, the arc and an arcing electrode. Usually the arcing electrode is connected to the negative power line and the melt electrode is connected to the positive line, so the arcing electrode operates cathodically and the melt electrode operates anodically.

A portion of the bar forming the melt electrode, adjacent to the inner end of the bar, is formed as a melted portion by the heat of the melt in the furnace hearth, and a portion of the bar adjacent to the outer end is maintained as an unmelted portion by the refractory encasement being provided with means for removing heat from the bar.

In other words, the innermost portion of the metal bar forming the melt electrode, is molten and its outermost portion is solid. The outermost end of the bar is fixed, as by soldering, to a normally copper terminal with which an appropriate one of the usual power lines is connected, and usually this terminal is suitably cooled.

Obviously there is a transition zone between the molten part of the bar and its solid portion. It is desirable that this transition zone be kept reasonably spaced from the outer or terminal end of the bar, a spacing hopefully obtained by cooling of the refractory encasement of the bar and of the terminal at the outer end of the bar.

Melt electrodes of the above type are disclosed in one form by the Stenkvist U.S. Pat. No. 3,997,712, Dec. 14, 1976, and by the Andersson application Ser. No. 744,234, filed Nov. 23, 1976, which is a continuation of Ser. No. 634,061, filed Nov. 21, 1975 (since abandoned), both this patent and the application being owned by the assignee of the present application and the invention it discloses.

It is to be understood that the bar forming the melt electrode ordinarily has a composition the same as or compatible with the melt being processed in the furnace. The melt in the furnace and the melted inner portion of the bar forming the melt electrode, in effect, integrate with that portion of the bar merging with the unmelted portion of the bar extending to its terminal end.

In an electric arc furnace the electric currents introduced to the melt by the melt terminal in the circuit including the arc and arcing electrode, have the effect of electrodynamically inducing stirring currents or flow in the melt. It has been found that such flow or movements of the melt extend not only past the inner end of the melt electrode but down into its melted portion as well. Therefore, the heat transmitted to the melt electrode and which must be removed from the outer end portion of this electrode to keep that portion solid metal, is transmitted not only by conduction, as might be expected, but also by convection heating, the electrically induced melt flow currents reaching down into or possibly being internally created in the inner or molten end portion of the melt electrode. The result of this convection heating is that with some furnace installations the transition zone between the melted and unmelted portions of the melt electrode bar, may shift undesirably close to the outer terminal end of the bar.

One purpose of the present invention is to in a practical way reduce such convection transmittal of heat from the furnace melt to the unmelted outer end or terminal end portion of the melt electrode of a DC electric arc furnace.

SUMMARY OF THE INVENTION

To achieve the above object, particles having a higher density and melting temperature than the melt in the electric arc furnace hearth, are distributed throughout at least the melted portion of the bar forming the melt electrode, and at least adjacent to the unmelted portion. Of necessity, the refractory encasement for the melt electrode bar extends generally downwardly at least throughout the melted or molten portion of the bar, so these particles can rest in that portion on the unmelted portion at its transition with the molten portion.

These particles should have a shape and particle size forming interconnecting spaces between the particles and which spaces are substantially or completely filled by the molten portion of the melt electrode bar, to form a mixture of the particles and the melt portion of the bar to provide electrical conductivity from the unmelted portion of the bar to the melt in the furnace. In other words, a heterogenous interconnecting series of parallel electrically conducting paths are formed.

With appropriate proportioning of the cross-sectional area of the refractory encasement passage containing the melt electrode bar, the series or multiplicity of parallel electrical conductivity paths provided by the molten metal filling the spaces between refractory particles of adequate density to avoid buoyancy, can provide adequate electrical conductivity to carry the arcing power into the melt and so to the arc and arcing electrode. At the same time, the particles act as impedances to any flow or movement between the various paths of molten melt electrode metal so that although melt flow may be induced in the melt by the electrodynamic effects, such flow or melt movement cannot reach into the refractory encasement encasing the melt electrode. The transfer of heat from the melt to the melt electrode by convection is in this way avoided or substantially reduced. In addition, even heating by conduction is reduced because the dispersed or multiple paths of conductivity created by the many interconnecting spaces between the refractory, cannot conduct heat as efficiently as can solid metal melted or unmelted. Furthermore, the cooling effected by the normal forced cooling, as by water-cooling, of the melt electrode refractory encasement, is made more efficient.

The multiple, parallel paths of molten melt electrode bar, interspaced by the refractory and relatively non-conductive particles, inherently have less overall conductivity than the solid portion of the melt bar forming the melt electrode. However, this can be compensated for by making the melt electrode encasement flare towards the melt in the furnace so that the cross-sectional area of this passage gradually, or perhaps abruptly, increases inwardly towards the furnace heat. The liquidous-solidous interface of the melt electrode bar is not sharply defined; it is an area of intermixed metal particles or crystals and molten metal between the melted or unmelted portions of the melt electrode bar.

Therefore, by flaring the melt electrode passage of the cooled refractory encasement for the melt electrode, the difference between the conductivity of the solid metal bar and of its melted portion containing the refractory, high density particles, can be made to proportionately compensate by the increasing cross-sectional area, for the resistance of the particles on the electrical conductivity.

It is to be understood that the above compensation need not be effected with great precision. It is possible to design the melt electrode bar with a greater cross-sectional area throughout its unmelted portion than would be indicated considering electrical conductivity, so that it merges with its melted portion containing the particles inhibiting the otherwise inherent fluid flow of melted metal, and the electrical power is transmitted effectively to the melt in the furnace.

As examples of the refractory particles of adequately high density, any of the usual electric furnace hearth materials may be used providing they are not buoyant when immersed in the molten metal of either the melt electrode or the melt in the furnace hearth. The particle size considered appropriate may range from 2 to 150 mm. Any oxide which is heavier than the melt, which is usually ferrous melt such as steel, may be used. Also, as a particularly suitable material, thorium oxide or hafnium oxides are suggested. However, these are poisonous materials. Therefore, instead of such materials it is preferred that by using powdered metal techniques, the particles be made with tungsten or tantalum cores completely surrounded by either aluminum oxide or magnesium oxide, and volumetric proportions between either of these metals and the oxides be related so that the particles have a density of 10 or more in grams per cubic centimeter. The coating of oxide over the metal should effectively prevent the metal from alloying with the metal of the melt electrode. Electric furnaces are usually used to refine and/or adjust the composition of steel and, therefore, the melt electrode is normally a steel bar.

Preferably the manufactured particles or granules or grains referred to above should have a particle size of 2 to 50 mm and even more preferably from 2 to 20 mm. The heavy metal cores or internals are preferably shaped in the form of fine needles or pins completely encased by the oxide, because it has been found that these metal shapes effect to reinforce or strengthen the overall particles when they are finished. As previously indicated, such particles can be made by the practice of existing powdered metal techniques.

In addition to providing for more uniform electrical conductivity throughout the length of the melt electrode metal bar when using the refractory encasement passage which flares towards the melt in the hearth of the furnace, the angularity of this flare, which can be generally conical or funnel-shaped, can be related to the particle size of the particles used to practice this invention, so the passage can function to hold the particles wedged in position and permit the refractory high density particles to be charged into this flared and downwardly tapered passage when making up the bottom of an electric arc furnace hearth. No specially shaped metal bar need be used at that time, but the metal bar should be positioned in its encasement passage prior to starting up the furnace. During start-up with a scrap charge, the usual starting electrode is used to put power into the charge until a pool of melt is formed adequate to run into the particles and join with the metal bar inserted at their bottom. When this occurs, the starting electrode can be withdrawn as normal with the power current commutating to the melt electrode, which would then be formed by the melt which is flowed down between the spaces formed between the refractory high-density particles so as to join with the solid bar metal. In this way the melt electrode is formed partially by the melt, as contrasted to the more usual practice of initially positioning a solid bar through the melt electrode encasement for contact with the melt and subsequent partial melting by the heat of the latter.

Although more expensive, it is possible to separate from the electric furnace cast a special melt electrode bar with the refractory high density particles positioned in the top of the necessary mold, this resulting in a melt electrode formed from solid metal with its upper or inward inner end containing the particles. When installed in the furnace, with this composite bar fitting the furnace's melt electrode refractory encasement, the upper portion then becomes wholly or partially molten with the particles functioning as previously described.

BRIEF DESCRIPTION OF THE DRAWINGS

In the accompanying drawings the principles of the invention are illustrated as follows.

DETAILED DESCRIPTION

Figure 1:
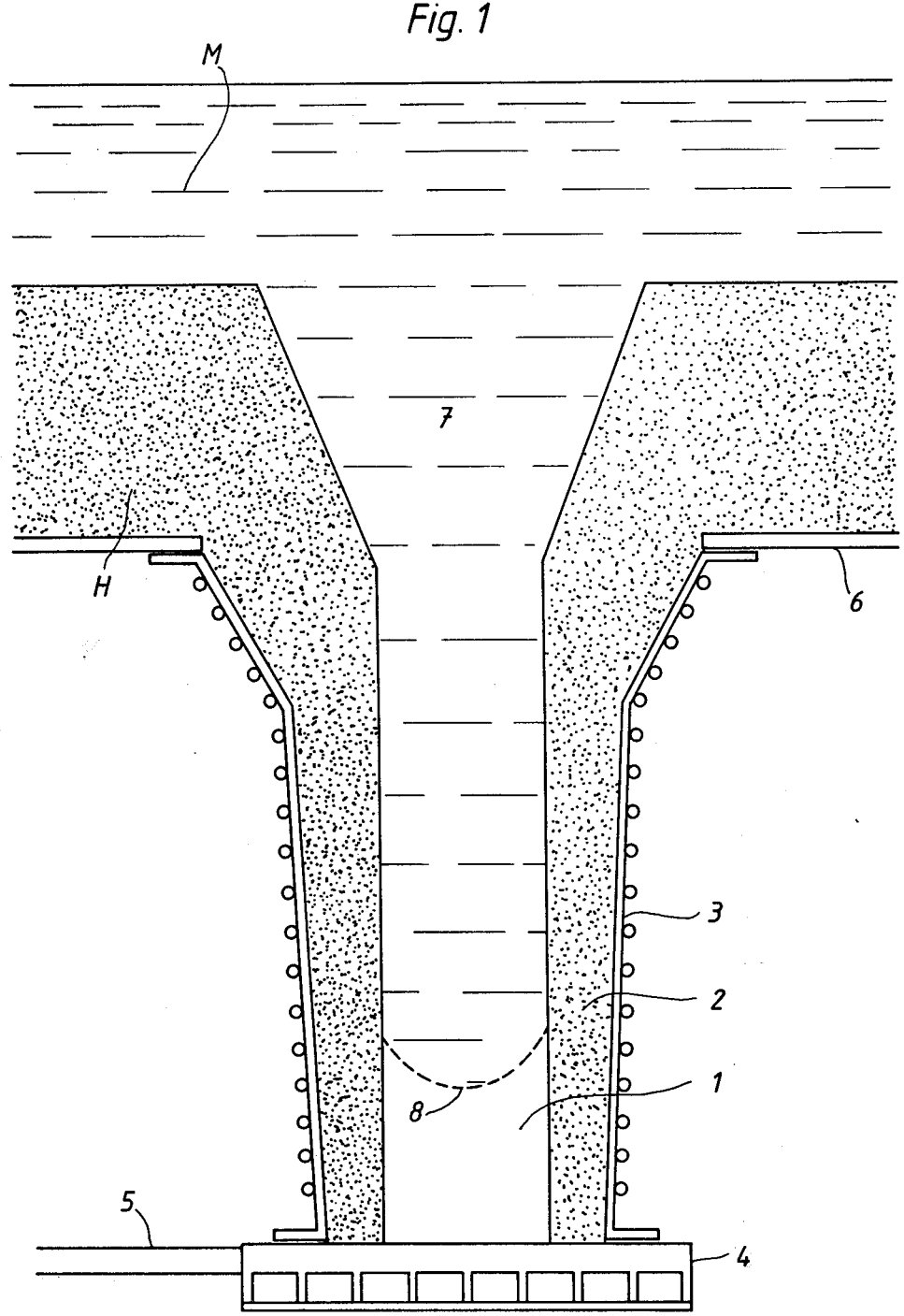
FIG. 1 which discloses a conventional form of melt electrode and which is provided to illustrate the problem solved by the present invention.

Having reference first to FIG. 1, H indicates a typical DC electric arc furnace hearth containing a melt M which in this case may be assumed to be a steel melt. In this case the present invention is not being used, the solid metal portion of the hearth electrode being indicated at 1 and which originally comprised a steel bar extending for the full length of the passage formed by the refractory encasement 2 which could be largely an extension of the hearth H. The encasement's water-cooled steel shell is shown at 3 and a water-cooled electrical terminal is shown at 4 with its connecting electric cable 5. The hearth H is also, of course, refractory and is supported by the usual steel shell 6. The hearth forms a funnel-shaped portion from the mouth 7, the liquid melt extending downwardly to the liquidous — solidous zone or area 8 below which the hearth or electrode is maintained solid by the water cooling of its encasement's water-cooled shell 3 and its water-cooled terminal 4 at the outer end of the electrode.

Assuming that power is on the furnace having these parts, with the arc in operation in the usual manner, the electric power current must travel through the melt electrode and to the melt. In the liquid portion of the melt electrode currents are induced which together with the currents induced in the melt M, serve to exert melt stirring force throughout the melted portion of the electrode and the flaring mouth 7 as well as in the melt M.

The result of such stirring forces, electro-dynamically induced, is that there is a constant stirring action between the melt M, the mouth 7, and the molten portion of the melt electrode extending downwardly. Although there is some heat transferred solely by conduction and to some extent by the passage of current through the melt electrode, it has been found that the major amount of heat transfer is by convection between the melt and the melt electrode induced by the various electro-dynamic current flows involved inherently. In other words, most of the heat transfer is by convection.

The result of the high heat transfer due to the convection action caused by the various flows of molten metal, is that the line or zone indicated at 8 between the melted and umelted portions of the hearth electrode, tends to creep undesirably close to the outer end of the melt electrode and its electric terminal 4. To prevent this, the melt electrode and its encasement 2 and water-cooled shell 3 sometimes must be made undesirably long. This is both expensive and involves undesirable furnace design complications, keeping in mind that an electric arc furnace is usually a tilting furnace.

Figure 2:
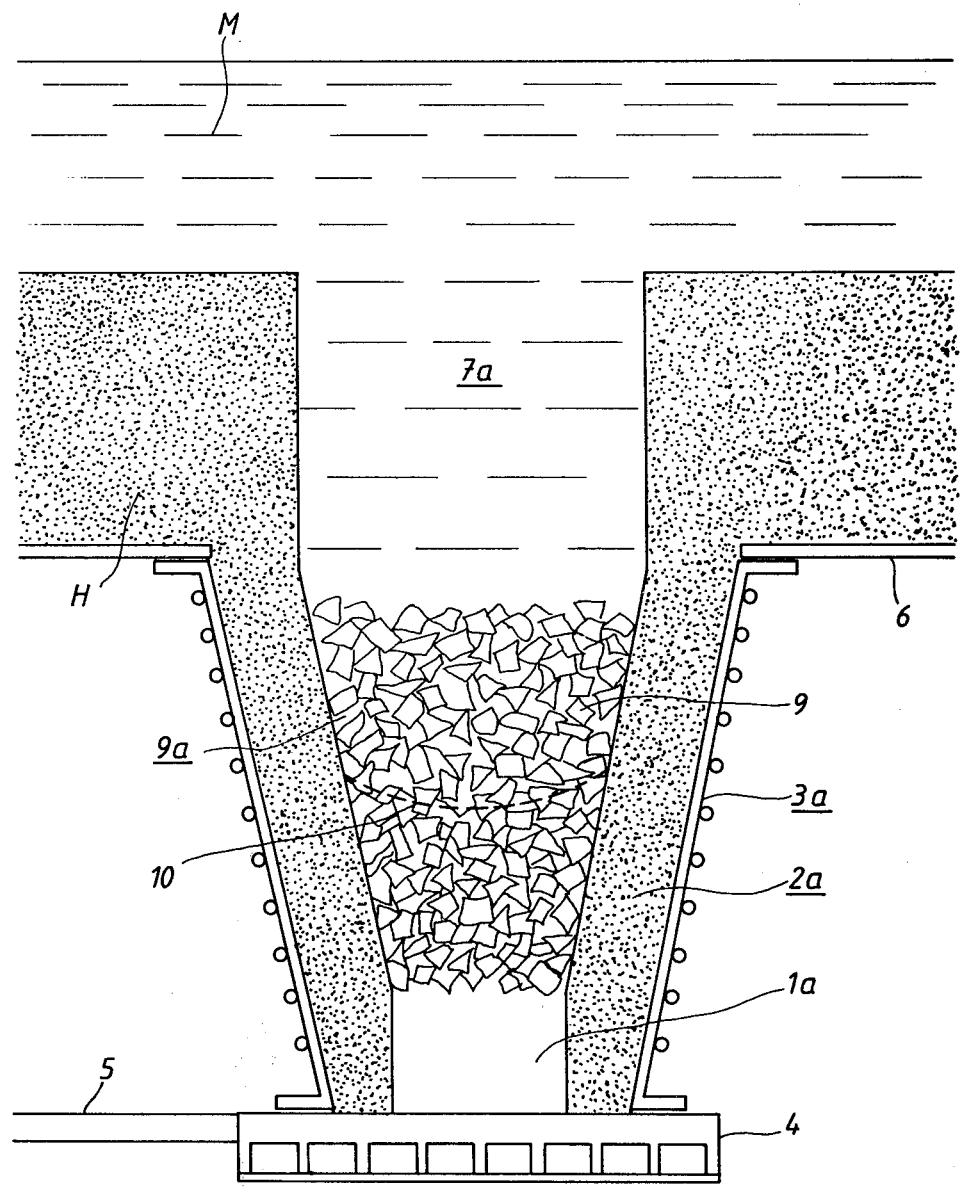
FIG. 2 wherein the present invention is schematically illustrated along with its solution to the problem.

The present invention avoids the above complications and disadvantages. As illustrated by FIG. 2, the refractory encasement 2a can be made much shorter, making its water-cooled steel shell 3a substantially shorter. In this case the encasement 2a and its water-cooled shell 3a are made to flare upwardly or inwardly towards the mouth 7a which communicates with the melt M. In this way, when making up the furnace bottom the previously described particles 9 can be dropped into the downwardly tapered encasement 2a so as to jam into the refractory encasement 2a whether or not the usual, but in this case, much shorter, solid metal bar 1a is first inserted, although it could be in the interest of assuring that the particles or granules 9 do not continue to drop when initially charged.

The various particles 9 can be made with irregular shape and sharp corners so as to assure the formation of the previously mentioned interconnecting spaces 9a.

When the melt M is formed, it flows into the portion 7a and down through, and while substantially filling the spaces 9a until in contact with the metal bar 1a; it should have been inserted at that time with its end electric terminal 4 in position, normally being soldered or otherwise fixed to the solid metal bar portion.

Also as previously suggested, the melt terminal could be a cast form with the particles 9 cast so as to form an upwardly flaring ingot represented in FIG. 2 roughly by the top level of the particle mass 9.

In any event, when the furnace is in normal operation, the previously described molten metal flows or currents are greatly impeded by the fact that instead of a solid molten mass of metal, a number of threads or strands or channels of molten metal form the electric conductivity paths. In this way metal flow due to the electrodynamic effects are substantially, if not entirely, prevented. In addition, the thermal conductivity paths are formed largely by static threads or strands of molten metal, the particles themselves having relatively low thermal conductivity. Heat transfer by convection from the melt M to the melt electrode is greatly reduced.

The result of the foregoing is that the zone or area between the liquid and solid metal of the melt electrode portions is safely maintained and spaced from the electrode's terminal end and its electric terminal 4, the possible position of the transition zone being indicated at 10 in FIG. 2.

The upward flare of the refractory encasement 2 and, therefore, of the melt electrode, is clearly indicated by FIG. 2. This flare should start above or inwardly with respect to the furnace hearth about where the solid metal 1a of the melt electrode terminates, with the flare or increasing cross-sectional area encompassing that portion of the melt electrode, whether solid or liquid, containing the particles 9. The degree of flare should be roughly corresponding to the decrease in electrical conductivity per square centimeter of metal caused by the presence of the particles 9. Other than for this, the flare of the encasement 2a should be such as considering the particle size of the particles 9 can assure that these particles will wedge in the passage of the encasement 2a. In any event, the bottom of the mass of particles, of course, rest on the solid portion of the melt electrode as shown at 1a.

When the principles of this invention are understood, it becomes obvious that the particles or granules used to prevent any stirring effects of the molten part of the hearth electrode, should be substantially inert with respect to the metal involved, normally steel. In addition, the density should be reasonably greater than that of the metal. In the case of steel, which has a density reasonably below 10 grams per cubic centimeter, the density of 10 is considered to be safe. If to achieve this density the powdered metallurgy granules previously mentioned are used, the metal encasements, normally of an oxide, should completely protect against any alloying action. If the metal part becomes exposed and can alloy with the molten metal of the melt electrode, or if chemical reactions are possible, the particles or granules would be destroyed and the desirable results of the present invention would be lost. This loss could also be occasioned if the particles or granules had a density too closely corresponding to that of the molten metal in which they are immersed. It is also evident that the particles or granules should have such shapes, normally irregular or rough, as to prevent them from compacting so closely together that there are no interconnecting spaces between them into which the molten metal of the melt electrode can penetrate to provide the multiplicity of parallel paths of conductivity required to get the arcing current into the melt.

With the usual DC arc furnace connections where the melt electrode functions anodically, the arcing electrode functioning as a cathode, the described particles or granules, although loose from each other, remain quiet in the channel or passage of the refractory melt electrode encasement.

What is claimed is:

1. A DC electric arc furnace having a hearth adapted to contain a melt and a melt electrode formed by a metal bar encased by a refractory encasement forming a passage containing the bar with the latter having an inner end contacted by said melt and an outer end adapted for connection with an electric power line, a portion of the bar adjacent to said inner end being formed as a melted portion by the heat of a melt in said hearth and a portion of said bar adjacent to said outer end being maintained as an unmelted portion by said encasement having means for cooling said bar, and particles having a higher density and melting temperature than said melt and which are distributed throughout at least said melted portion at least adjacent to said unmelted portion, said particles having a shape and size forming interconnecting spaces therebetween and which spaces are substantially filled by said melted portion so as to provide electrical conductivity to said melt.

2. The furnace of claim 1 in which said particles are chemically substantially inert with respect to said metal bar including its said melted portion.

3. The furnace of claim 1 in which said passage increases in cross-sectional area for at least a part of its extent containing said particles.

4. The furnace of claim 3 in which said part tapers in a downward direction and said particles have a particle size causing them to jam or wedge in said part and be substantially self-sustaining.

5. The furnace of claim 1 in which said particles have a particle size of from about 2 to 150 mm.

6. The furnace of claim 1 in which said particles are formed by a refractory heavy metal encased by a non-metallic refractory which is substantially chemically inert with respect to said metal bar including its said melted portion.

* * * * *